United States Patent
Hori et al.

(10) Patent No.: US 7,567,051 B2
(45) Date of Patent: Jul. 28, 2009

(54) POSITION SHIFT CONTROL APPARATUS ENSURING DURABILITY AND OPERATION ACCURACY THEREOF

(75) Inventors: Masashi Hori, Anjo (JP); Haruki Matsuzaki, Oobu (JP); Tomoyuki Kashiwagi, Aichi-ken (JP); Masaaki Shinojima, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 242 days.

(21) Appl. No.: 11/812,077

(22) Filed: Jun. 14, 2007

(65) Prior Publication Data

US 2008/0001568 A1    Jan. 3, 2008

(30) Foreign Application Priority Data

Jun. 14, 2006    (JP)    .............................. 2006-164397

(51) Int. Cl.
  *G05B 1/06*    (2006.01)
  *H02P 3/06*    (2006.01)
  *H02P 7/00*    (2006.01)

(52) U.S. Cl. .......................... 318/468; 318/432; 74/335; 477/98; 477/115

(58) Field of Classification Search ................. 318/432, 318/468, 630, 652, 701; 477/98, 115; 74/335, 74/473.18, 473.36; 188/161
See application file for complete search history.

(56) References Cited

U.S. PATENT DOCUMENTS

| 7,040,187 | B2 * | 5/2006 | Amamiya et al. | ............. 74/335 |
| 7,075,259 | B2 * | 7/2006 | Nakai et al. | .................. 318/432 |
| 7,084,597 | B2 * | 8/2006 | Nakai et al. | ............. 318/254.1 |
| 7,107,869 | B2 * | 9/2006 | Amamiya et al. | ............. 74/335 |
| 7,155,328 | B2 * | 12/2006 | Kotter et al. | ................... 701/51 |
| 7,382,107 | B2 * | 6/2008 | Hori et al. | .................... 318/630 |
| 7,426,881 | B2 * | 9/2008 | Kozu et al. | ............... 74/473.12 |
| 2004/0200301 | A1 * | 10/2004 | Amamiya et al. | ............. 74/335 |
| 2004/0200683 | A1 * | 10/2004 | Amamiya et al. | .......... 192/3.58 |
| 2005/0066759 | A1 * | 3/2005 | Hirota et al. | ................ 74/473.1 |
| 2005/0081670 | A1 * | 4/2005 | Kozu et al. | .................. 74/473.1 |
| 2005/0139030 | A1 * | 6/2005 | Shimamura et al. | ....... 74/473.12 |
| 2005/0146302 | A1 * | 7/2005 | Kamio et al. | ................ 318/647 |
| 2005/0151492 | A1 * | 7/2005 | Nakai et al. | .................. 318/432 |

(Continued)

FOREIGN PATENT DOCUMENTS

DE    102 15 116 C1    7/2003

(Continued)

*Primary Examiner*—Paul Ip
(74) *Attorney, Agent, or Firm*—Nixon & Vanderhye, PC

(57) ABSTRACT

A position shift control apparatus is provided which includes an electrical motor joined to an object through an output shaft and a torque transmission mechanism, a detent mechanism producing elastic pressure to hold the object at a target position, and a motor controller. When torque, which is created by the elastic pressure produced by the detent mechanism and acts on the output shaft during rotation of the motor, is opposite in orientation to that outputted by the motor, the motor controller determines the angular position of the motor, as sampled upon a change in an output from an output shaft position sensor, as a reference angular position of the motor for use in controlling the position of the motor, thereby resulting in a decrease in mechanical load on the detent mechanism and the torque transmission mechanism to ensure the durability and operation accuracy of the apparatus.

8 Claims, 8 Drawing Sheets

U.S. PATENT DOCUMENTS

| | | | |
|---|---|---|---|
| 2005/0160849 A1* | 7/2005 | Kozu et al. | 74/335 |
| 2005/0176555 A1* | 8/2005 | Osamura et al. | 477/115 |
| 2005/0218860 A1* | 10/2005 | Kimura et al. | 318/712 |
| 2005/0247154 A1* | 11/2005 | Osamura et al. | 74/473.12 |
| 2005/0257637 A1* | 11/2005 | Osamura et al. | 74/473.1 |
| 2006/0011003 A1* | 1/2006 | Osamura et al. | 74/335 |
| 2006/0033464 A1* | 2/2006 | Nakai et al. | 318/701 |
| 2006/0163025 A1* | 7/2006 | Hori et al. | 192/219.5 |
| 2006/0197489 A1* | 9/2006 | Nakai et al. | 318/701 |
| 2006/0207373 A1* | 9/2006 | Amamiya et al. | 74/473.36 |
| 2007/0046243 A1* | 3/2007 | Hori et al. | 318/630 |

FOREIGN PATENT DOCUMENTS

| | | |
|---|---|---|
| EP | 1 437 533 A1 | 7/2004 |
| JP | 07-081448 | 3/1995 |
| JP | 2002-310294 | 10/2002 |
| JP | 2004-015849 | 1/2004 |
| JP | 2004-023890 | 1/2004 |
| JP | 2004-023932 | 1/2004 |
| JP | 2004-308752 | 11/2004 |

* cited by examiner

FIG. 7

TARGET CONTROLLED MOTOR POSITION TABLE 1

| TARGET RANGE | P-SIDE WALL | P RANGE | R RANGE | N RANGE | D RANGE | L RANGE | D-SIDE WALL |
|---|---|---|---|---|---|---|---|
| TARGET POSITION OF MOTOR | −1000 | 0 | $D_{P-R}$ | $D_{P-N}$ | $D_{P-D}$ | $D_{P-L}$ | +2000 |

FIG. 8

TARGET CONTROLLED MOTOR POSITION TABLE 2

| TARGET RANGE | P-SIDE WALL | P RANGE | R RANGE | N RANGE | D RANGE | L RANGE | D-SIDE WALL |
|---|---|---|---|---|---|---|---|
| TARGET POSITION OF MOTOR | −1000 | $P_{PW}$ (※1) | $D_{P-R}+P_{PW}$ | $D_{P-N}+P_{PW}$ | $D_{P-D}+P_{PW}$ | $D_{P-L}+P_{PW}$ | +2000 |

※$P_{PW}$=PwStep+a

FIG. 9

TARGET CONTROLLED MOTOR POSITION TABLE 3

| TARGET RANGE | P-SIDE WALL | P RANGE | R RANGE | N RANGE | D RANGE | L RANGE | D-SIDE WALL |
|---|---|---|---|---|---|---|---|
| TARGET POSITION OF MOTOR | −1000 | $P_E$ (※2) | $D_{P-R}+P_E$ | $D_{P-N}+P_E$ | $D_{P-D}+P_E$ | $D_{P-L}+P_E$ | +2000 |

※$P_E$=$dp_0$−$dp$

POSITION SHIFT CONTROL APPARATUS ENSURING DURABILITY AND OPERATION ACCURACY THEREOF

CROSS REFERENCE TO RELATED DOCUMENT

The present application claims the benefit of Japanese Patent Application No. 2006-164397 filed on Jun. 14, 2006, the disclosure of which is incorporated herein by reference.

BACKGROUND OF THE INVENTION

1. Technical Field of the Invention

The present invention relates generally to a position shift control apparatus designed to shift the position of an object joined to an output shaft connected to an electric motor through a torque transmission mechanism such as a speed reducer.

2. Background Art

In recent years, there has been an increasing tendency in automotive vehicles to replace mechanical drive systems with electrical ones equipped with an electrical motor for meeting requirements of space saving-designs or improvement of assemblability and controllability thereof. For example, Japanese Patent First Publication No. 2004-23890 (US 2006/0033464 A1) discloses an example of the electrical drive system designed to use an electrical motor to drive a range shift mechanism for automotive automatic transmissions. This system works to drive the range shift mechanism through an output shaft joined to an output shaft of the motor through a speed reducer to shift the gear range of the automatic transmission. The motor is equipped with an encoder to measure an angular position of the motor. When it is required to change the gear range of the automatic transmission, the system monitors a count of pulse signals outputted from the encoder and rotates the motor until a target angular position corresponding to a selected one of the gear ranges is reached.

The amount of rotation (i.e., a rotated angle) of the motor is converted by a torque transmission mechanism made of the speed reducer, etc. into that of the output shaft (i.e., a manipulated variable in the range shift mechanism). The torque transmission mechanism usually has mechanical backlash or play. For instance, the speed reducer has the backlash between gears installed therein. In the case where an end of the rotor of the motor which is of a noncircular cross section is fitted within a hole formed in the end of the output shaft to establish a mechanical joint therebetween, a small amount of clearance is typically formed between the end of the rotor and the hole of the output shaft for facilitating ease of insertion of the end of the rotor into the hole. The mechanical backlash or play in the torque transmission mechanism will result in an inevitable error in controlling the angular position of the output shaft (i.e., the manipulated variable in the range shift mechanism) based on the count value of the encoder, thus leading to a decrease in accuracy of operating the range shift mechanism.

In order to avoid the above problem, Japanese Patent First Publication No. 2004-308752 (US2006/0207373 A1) teaches a motor control system which perform an initial motor drive operation which rotates the motor until a limit of a rotatable range, as defined by a detent mechanism, is reached after start-up of the system and learns an angular position of the motor upon reach of the limit as a reference angular position of the motor, thereby compensating for the error arising from the backlash and play in the torque transmission mechanism.

Japanese Patent First Publication No. 2002-310294 teaches use of a neutral start switch (NSW) which measures each of gear shift positions in the range shift mechanism which correspond to the gear ranges of the automatic transmission, respectively, to learn the correspondence between the count value of the encoder and each of the gear shift positions, as measured by the NSW.

The motor control system, as taught in Publication No. 2004-308752, requires the execution of the initial motor drive operation every start-up of the system, thus resulting in an increase in mechanical load on the detent mechanism or parts of the torque transmission mechanism, which leads to a greater concern about the durability thereof.

The system, as taught in Publication No. 2002-310294, is designed to use an average of count values of the encoder, as sampled upon changes in on-of state of the NSW during a normal and a reverse rotation of the motor, respectively, to learn the reference angular position of the motor. The average indicates the center of each of the gear shift positions. The system, however, does not compensate for an error in learning the reference angular position at all which arises from the angle at which the NSW is mounted on the automatic transmission. Further, when the NWS is changed from the off-state to the on-state, torque which is created by elastic pressure, as produced by the detent mechanism, and acts on the output shaft of the motor is identical in orientation with that outputted by the motor, thus resulting in a difficulty in knowing whether the amount of backlash or play in the torque transmission mechanism is increasing or decreasing during the rotation of the motor. This also results in an additional error in learning the reference angular position of the motor.

SUMMARY OF THE INVENTION

It is therefore a principal object of the invention to avoid the disadvantages of the prior art.

It is another object of the invention to provide a position shift control apparatus designed to minimize the number of control operations exerting a mechanical load on, for example, a detent mechanism or parts of a torque transmission mechanism, and compensates for an error in shifting the position of an object which arises from backlash or play in the torque transmission mechanism to ensure the durability and controllability of the apparatus.

According to one aspect of the invention, there is provided a position shift control apparatus which may be employed in shifting the gear range of automotive automatic transmissions.

The position shift control apparatus comprises: (a) a motor joined to an object through an output shaft and a torque transmission mechanism to move the object to a target position; (b) a detent mechanism working to produce elastic pressure to hold the object at the target position; (c) an output shaft position sensor which measures an angular position of the output shaft to produce an output indicative thereof; (d) a motor position sensor which measures an angular position of the motor to produce an output indicative thereof; and (e) a controller which controls an operation of the motor to move the object. The controller determines a value of the angular position of the motor, as sampled upon a change in the output from the output shaft position sensor, as a reference angular position of the motor when torque, which is created by the elastic pressure produced by the detent mechanism and acts on the output shaft during rotation of the motor, is opposite in orientation to that outputted by the motor. The controller monitors the output of the motor position sensor and shifts the angular position of the motor into agreement with a position which corresponds to the target position of the object and is determined based on the reference angular position to move the object to the target position thereof.

When the torque created by the elastic pressure produced by the detent mechanism is opposite in orientation to that outputted by the motor, it will cause the backlash or play in the torque transmission mechanism to be minimized. Therefore, when such a condition is encountered, it becomes possible to learn the value of the angular position of the motor as the reference angular position of the motor free from the backlash or play in the torque transmission mechanism. The use of such a reference angular position in moving the motor to the target position minimizes the mechanical load on the detent mechanism or parts of the torque transmission mechanism and ensures the durability and operation accuracy of the position shift control apparatus.

In the preferred mode of the invention, the output shaft position sensor is mounted on the motor. The controller is designed to perform a reference angular position correction mode which rotates the motor until a limit of a rotatable range of the motor, as defined by the detent mechanism, is reached and then determines an angle between a value of the angular position of the motor at the limit, as indicated by the output of the motor position sensor, and the reference angular position as a learned value of a mounting angle at which the output shaft position sensor is mounted on the motor to correct the reference angular position using the learned value.

The apparatus further comprises a storage which retains the learned value of the mounting angle of the output shaft position sensor even when the controller is powered off. When the learned value is retained in the storage, the controller monitors the output of the motor position sensor and shifts the angular position of the motor into agreement with the position which corresponds to the target position of the object and is determined based on the reference angular position, as corrected by the learned value, to move the object to the target position thereof. In the absence of the learned value in the storage, the controller rotates the motor until the limit of the rotatable range of the motor is reached and then determines a value of the angular position of the motor at the limit as a temporal reference angular position of the motor for use in controlling the angular position of the motor based on the output of the motor position sensor. Subsequently, when the angular position of the motor reaches a position, as indicated by the output of the motor position as the reference angular position, the controller finds and determines the angle between the value of the angular position of the motor at the limit and the position, as indicated as the reference angular position, as the learned value of the mounting angle, and retains the learned value in the storage.

The storage may be made of a nonvolatile memory which continues to retain the learned value even in the absence of supply of power to the controller.

The storage may alternatively be made of a rewriteable nonvolatile memory.

The output shaft position sensor is equipped with a plurality of electrical contacts each of which is turned on when the output shaft lies in one of discrete positions. The controller determines which of the electrical contacts is in an on-state to know one of the discrete positions at which the output shaft is lying.

The output shaft position sensor may alternatively be designed to produce the output which changes in electrical level continuously with rotation of the output shaft for measuring the angular position of the output shaft continuously.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 7 is a table listing target controlled motor positions used in a first normal control operation executed in the system start program of FIG. 6;

FIG. 8 is a table listing target controlled motor positions used in a second normal control operation executed in the system start program of FIG. 6;

FIG. 9 is a table listing target controlled motor positions used in a third normal control operation executed in the system start program of FIG. 6.

DESCRIPTION OF THE PREFERRED EMBODIMENTS

Figure 1:
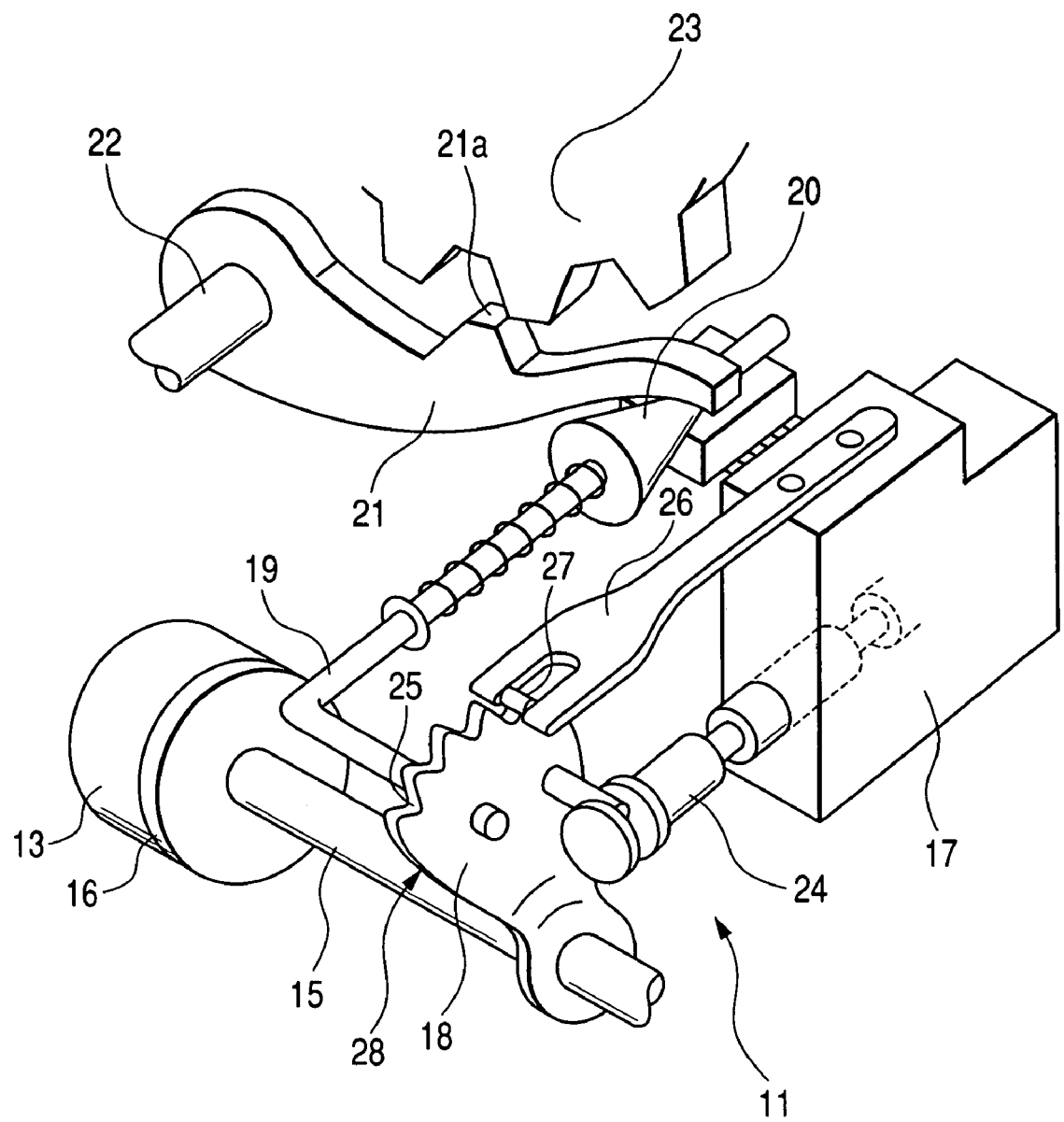
FIG. 1 is a perspective view which shows a gear shift mechanism working to shift a gear of an automatic transmission for automotive vehicles.
Figure 2:
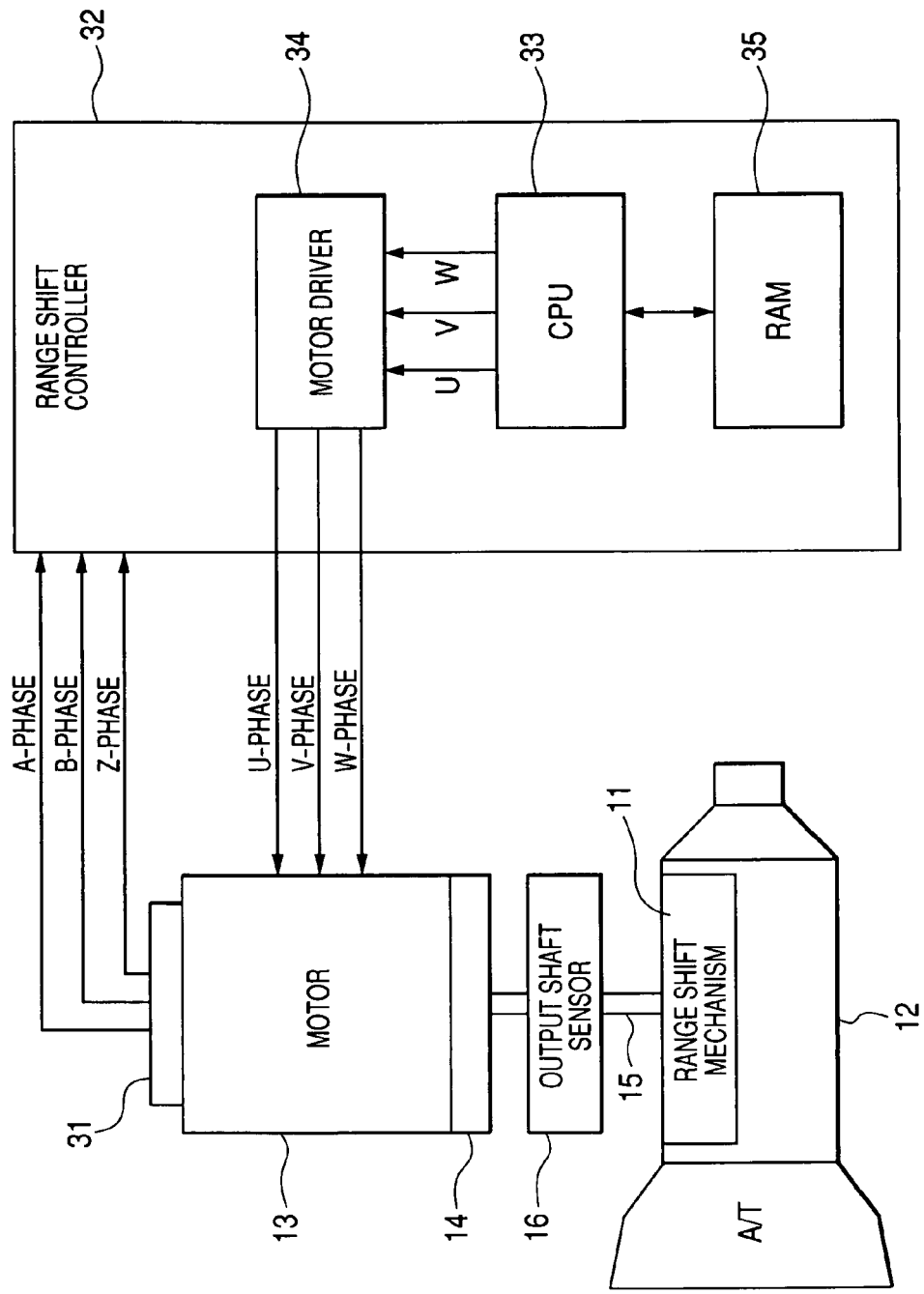
FIG. 2 is a block diagram which shows a position shift control system made up of the gear shift mechanism of FIG. 1 and a range shift controller according to the invention.

Referring to the drawings, wherein like reference numbers refer to like parts in several views, particularly to FIGS. 1 and 2, there is shown a range shift controller 32 according to the invention which is designed to control an operation of a range shift mechanism 11 installed in an automatic transmission 12 for automotive vehicles.

The range shift mechanism 11 works to change the gear of the automatic transmission 12. The automatic transmission 12, as referred to therein, has a typical structure which is designed to be switchable in operation between four gear ranges: a parking (P), range, a reverse (R) range, a neutral (N) range, a drive (D) range, and a low (L) range. The range shift mechanism 11 is used to shift the P, R, N, D, and L ranges of the automatic transmission 12 from one to another. The range shift mechanism 11 is driven by an electric motor 13. The synchronous motor 13 is made of a synchronous motor such as a switched reluctance motor (SRM) and has a speed reducing mechanism 14 installed therein, as shown in FIG. 2. The speed reducing mechanism 14 has an output shaft joined to the range shift mechanism 11 through an output shaft 15.

The output shaft 15, as clearly shown in FIG. 1, has secured thereon a detent lever 18 which changes a valve position of a manual valve 17 disposed in a hydraulic circuit of the automatic transmission 12. The detent lever 18 has jointed thereto an L-shaped parking rod 19 which has a conical head 20 in abutment with a lock lever 21. The lock lever 21 is shifted vertically, as viewed in the drawing, around a support shaft 22 as the conical head 20 is moved by a shifting motion of the parking rod 19, thereby locking or unlocking a parking gear 23. The parking gear 23 is joined to an output shaft of the automatic transmission 12. When the parking gear 23 is locked from rotating by the lock lever 21, it will cause driven wheels of the automotive vehicle to be placed in a parking mode.

The detent lever 18 has jointed thereto a spool valve 24 of the manual valve 17 through a pin. When the detent lever 18 is rotated by the synchronous motor 13 through the output shaft 15, it shifts the position of the spool valve 24 of the manual valve 17, thereby changing one of the P, R, N, D, and L ranges to another to shift the position of a hydraulic clutch installed in the automatic transmission 12 to a selected one.

Figure 3:
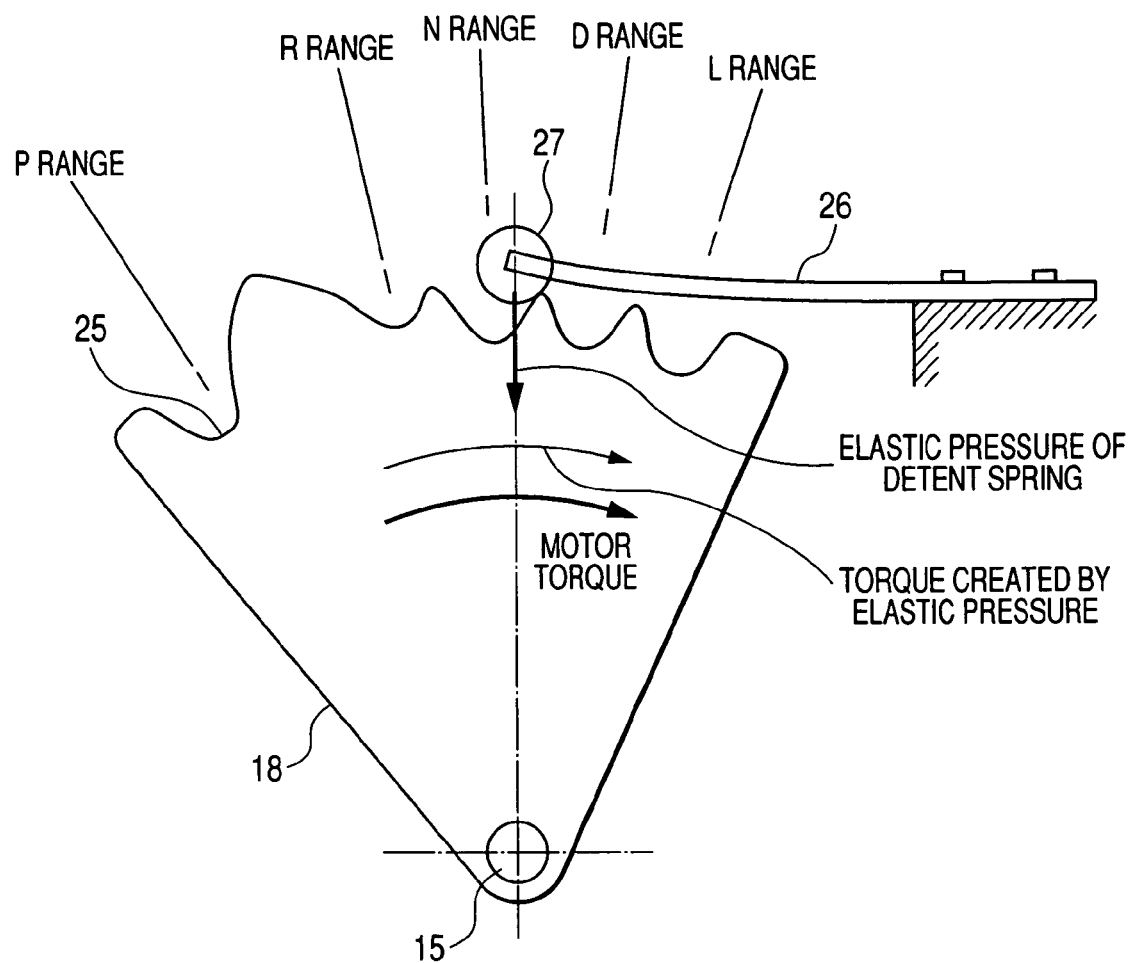
FIG. 3 is an explanatory view which demonstrates the event that a motor is turned on to rotate a detent lever about an output shaft in the clockwise direction, and torque, as created by elastic pressure of a detent spring, is identical in orientation with that outputted by the motor.

The detent lever 18 has a waved end wall in which five recesses 25 are, as clearly illustrated in FIG. 3, formed. The recesses 25 serve to hold the spool valve 24 at any one of five positions corresponding to the P, R, N, D and L ranges of the automatic transmission 12, respectively. The five recesses 25 will also be referred to below as P-range, R-range, N-range, D-range, and L-range recesses which, respectively, correspond to the P, R, N, D and L ranges of the automatic transmission 12. A detent spring 26 is firmly fixed on the manual valve 17. The detent spring 26 has affixed to the tip thereof a pin 27 which engages a selected one of the recesses 25 of the detent lever 18 to hold the detent lever 18 at a corresponding one of five angular positions thereof, thereby holding the spool valve 24 of the manual valve 17 at the position corresponding to a selected or target one of the P, R, N, D, and L ranges of the automatic transmission 12. The detent lever 18 and the detent spring 26 form a detent mechanism 28.

When it is required to establish the P range, the parking rod 19 is moved to the lock lever 21 and then lifts it up at a large-diameter portion of the conical head 20 to bring a protrusion 21a of the lock lever 21 into engagement with one of gear teeth of the parking gear 23 so that the parking gear 23 is locked. This causes the output shaft (i.e., a driving shaft) of the automatic transmission 12 to be locked and placed in the parking mode.

Alternatively, when it is required to establish the gear range other than P range, the parking rod 19 is moved away from the lock lever 21 to bring the conical head 20 into disengagement from the lock lever 21, so that the protrusion 21a leaves one of gear teeth of the parking gear 23. This causes the output shaft of the automatic transmission 12 to be unlocked and allowed to rotate to ensure the running of the vehicle.

Figure 5:
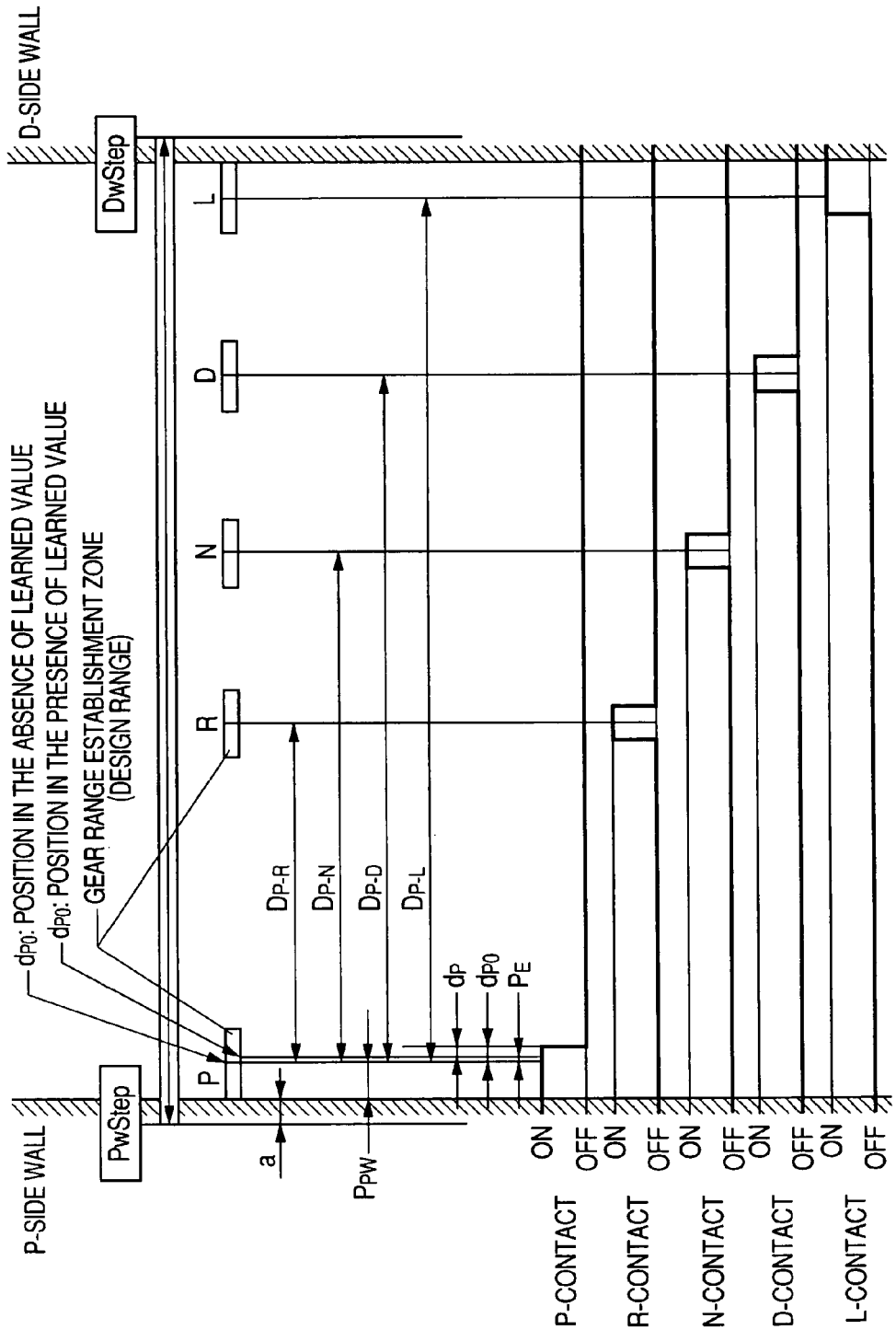
FIG. 5 is an explanatory view which illustrates the relation among a rotatable range of a motor, a layout of contacts of an output shaft sensor, and target controlled motor position to achieve a gear shift in an automatic transmission.

The motor 13, as illustrated in FIG. 2, also includes an output shaft sensor 16 which measures an angular position of the motor 13 and outputs a signal indicative thereof. The output shaft sensor 16 is made of an electrical switch which works to produce patterns of on- and -off signals indicating discrete angular positions of the output shaft 15 which match the P, R, N, D, and L positions of the gear shift lever (i.e., the P, R, N, D, and L ranges of the automatic transmission 12). Specifically, the switch has, as illustrated in FIG. 5, five contacts: a P-contact, an R-contact, an N-contact, a D-contact, and an L-contact each of which is turned on to produce an on-signal when the output shaft 15 falls, as can be seen in FIG. 5, in one of five gear range establishment zones (i.e., design angular ranges which will also be referred to simply as angular ranges below) P, R, N, D, and L matching the P, R, N, D, and L ranges of the automatic transmission 12. Specifically, the switch works to produce patterns of combinations of on/off binary signals different among the angular ranges P, R, N, D, and L, thereby indicating in which of the five angular ranges P, R, N, D, and L the output shaft 15 is placed.

The synchronous motor 13, as illustrated in FIG. 2, has also installed thereon an encoder 31 working as an angular position sensor to measure an angular position of a rotor of the synchronous motor 13. The encoder 31 is implemented by, for example, a magnetic rotary encoder which is designed to output A-, B-, and Z-phase pulse signals, in sequence, in synchronization with rotation of the rotor of the synchronous motor 13 to the range shift controller 32. The range shift controller 32 has installed therein a CPU 33 which counts both a leading and a trailing edge (also called a rising and a falling edge) of each of the A- and B-phase signals and uses such a count value (will also be referred to as an encoder count value below) to select one of the phases of the synchronous motor 13 to be energized in a scheduled sequence through a motor driver 34, thereby achieving rotation of the synchronous motor 13.

The CPU 33 samples an input sequence of the A- and B-phase signals to determine a rotational direction of the rotor of the synchronous motor 13 and increments the encoder count value when the synchronous motor 13 is rotating in a normal direction in which the gear range of the automatic transmission 12 is shifted from the P to D range or decrements the encoder count value when the synchronous motor 13 is rotating in a reverse direction in which the gear range of the automatic transmission 12 is shifted from the D to P range. This establishes a matching between the encoder count value and the angular position of the synchronous motor 13 regardless of the rotational direction of the synchronous motor 13. The CPU 33 also samples the encoder count value to determine the angular position of the synchronous motor 13 and energizes one(s) of windings of phases of the synchronous motor 13 corresponding to the determined angular position to activate the synchronous motor 13. Note that the Z-phase signal outputted by the encoder 31 is used in the CPU 33 to detect a reference angular position of the rotor of the synchronous motor 13.

The amount of rotation (i.e., a rotated angle) of the motor 13 is converted by a torque transmission mechanism made up of the speed reducer 14, the output shaft 15, and the detent lever 18 into a manipulated variable in the range shift mechanism 11 (i.e., the amount by which the spool valve 24 is to be moved). The torque transmission mechanism usually has mechanical backlash or play. For instance, the speed reducer 14 has the backlash between gears installed therein. In the case where an end of the rotor of the motor 13 which is of a noncircular cross section is fitted within a hole formed in the end of the output shaft 15 to establish a mechanical joint therebetween, a small amount of clearance is typically formed between the end of the rotor and the hole of the output shaft 15 for facilitating ease of insertion of the end of the rotor into the hole.

When the pin 27 of the detent spring 26 moves toward the P range or the L range and engages one of the recesses 25 of the detent lever 18, there is a small amount of clearance or play between the peripheral wall of the pin 27 and one or both of side walls of the recess 25.

As described above, the torque transmission mechanism working to convert the amount of rotation of the motor 13 into the manipulated variable in the range shift mechanism 11 has the mechanical backlash or play, thus resulting in an inevitable error in the manipulated variable in the range shift mechanism 11 even when the CPU 38 monitors the count value of the encoder 31 to control the amount of rotation (i.e., a rotated angle) of the motor 13 accurately.

Figure 4:
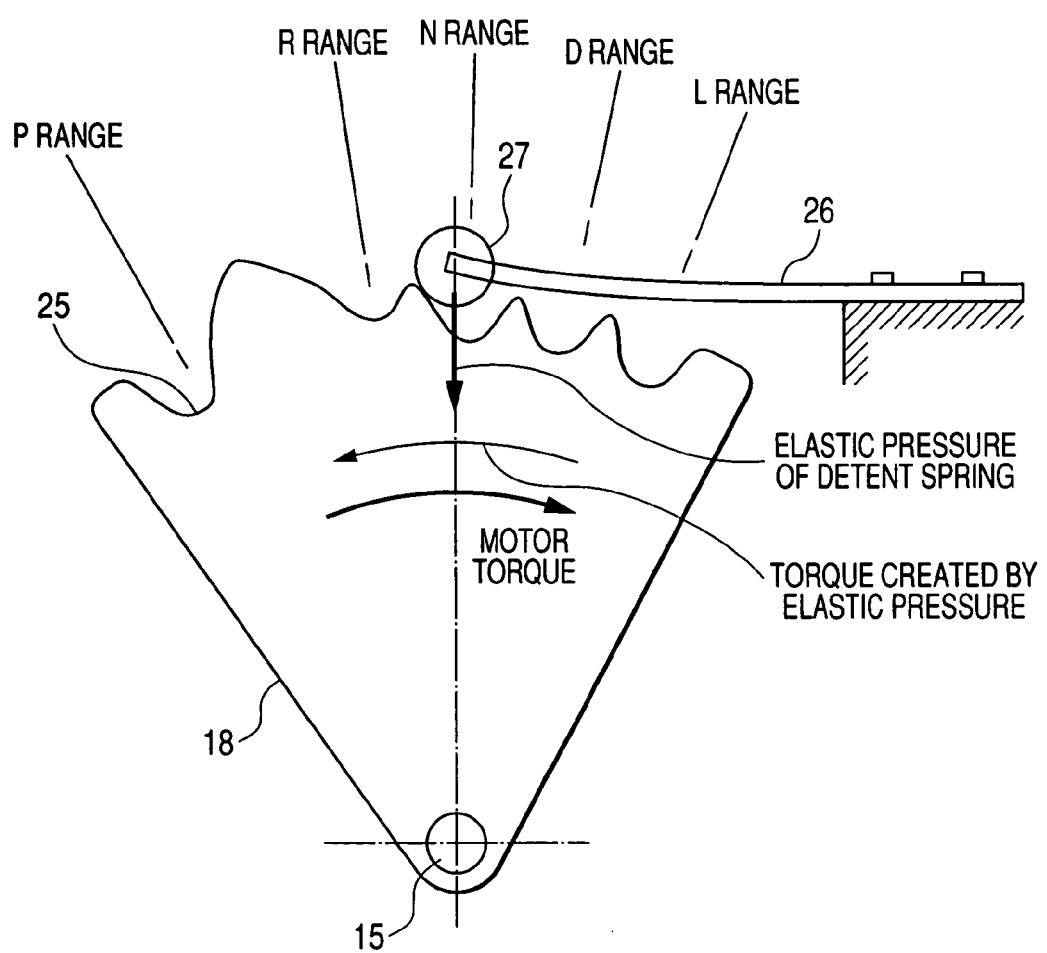
FIG. 4 is an explanatory view which demonstrates the event that a motor is turned on to rotate a detent lever about an output shaft in the clockwise direction, and torque, as created by elastic pressure of a detent spring, is opposite in orientation to that outputted by the motor.

The detent spring 26 works to produce elastic pressure which, as can be seen from FIGS. 3 and 4, acts on the detent lever 18 in a direction facing the axis about which the detent lever 18 rotates (i.e., the center of the output shaft 15). Most of the surface of each of the recesses 25 of the detent lever 18 slops, thus causing the elastic pressure, as produced by the detent spring 26, to create torque acting on the detent lever 18 when the pin 27 of the detent spring 26 slides on the surface of the recess 25. Specifically, as demonstrated in FIG. 3, when the motor 13 is turned on to rotate the detent lever 18 about the output shaft 15 in the clockwise direction, as viewed in the drawing, and the torque, as created by the elastic pressure of the detent spring 26, is identical in orientation with the torque outputted by the motor 13, that is, when the P-contact, R-contact, N-contact, D-contact, or L-contact of the output shaft sensor 16 is changed from the off-state to the on-state, it is impossible to know whether the amount of backlash and play of the torque transmission mechanism is increasing or decreasing.

Alternatively, as demonstrated in FIG. 4, when the motor 13 is turned on to rotate the detent lever 18 about the output shaft 15 in the clockwise direction, as viewed in the drawing, and the torque, as created by the elastic pressure of the detent spring 26, is opposite in orientation to the torque outputted by the motor 13, that is, when the P-contact, R-contact, N-contact, D-contact, or L-contact of the output shaft sensor 16 is changed from the on-state to the off-state, it will result in a decrease in amount of backlash and play of the torque transmission mechanism.

Base on the above facts, the CPU 33 of the range shift controller 32 is designed to learn, as a reference angular position of the motor 13, the angular position of the motor 13 when the direction of torque, as created by the elastic pressure of the detent spring 26, is opposite that of torque outputted by the motor 13, for example, when the motor 13 rotates to move the detent lever 18 from the P-range position to the R-range position, so that the P-contact of the output shaft sensor 16 is changed from the on-state to the off-state, that is, that a trailing edge (which will also be referred to as a P-edge below) appears at the signal, as produced by the P-contact of the output shaft sensor 16. The CPU 33 monitors the count value of the encoder 31 to control the angular position of the motor 13 based on the learned reference angular position.

Specifically, when the torque, as created by the elastic pressure of the detent spring 26, is opposite in orientation to the torque, as outputted by the motor 13, during rotation of the motor 13, the amount of backlash and play of the torque transmission mechanism is minimized. When such a condition is encountered, the CPU 33, as described above, samples the P-edge of the signal outputted from the output shaft sensor 16 and determines it as the reference angular position of the motor 13, thereby ensuring the accuracy in controlling the position of the motor 13 free from the backlash and play of the torque transmission mechanism.

The range shift controller 32 is also designed to correct the reference angular position of the motor 13 to compensate for an error in angle at which the output shaft sensor 16 is mounted on the motor 13. Such correction is achieved by reversing the motor 13 until the pin 27 of the detent spring 26 hits the side wall of the P-range recess 25 (which will be also referred to as a P-side wall below) that is one of limits of a movable range in the range shift mechanism 11 on the side of the P range of the automatic transmission 12 (which will be referred to as P-side wall hitting control operation), sampling the count value PwStep of the encoder 31 at such a position, sampling the count value $d_{p0}$ of the encoder 31 upon appearance of the P-edge at the output of the output shaft sensor 16 (i.e., upon change in the P-contact of the output shaft sensor 16 from the on-state to the off-state), and stores the count value $d_{p0}$ in a backup RAM 35 of the range shift controller 32 as data on the mounting angle of the output shaft sensor 16. The backup RAM 35 is implemented by a nonvolatile memory such as an SRAM which retains the count value $d_{p0}$ with aid of power from a backup power supply while the range shift controller 32 is turned off. In place of the backup RAM 35, a rewritable nonvolatile memory such as an EEPROM may be employed.

When the count value $d_{p0}$ is already stored in the backup RAM 35 upon start-up of the range shift controller 32, the CPU 33, as described above, corrects or updates the reference angular position of the motor 13 (i.e., the count value $d_p$ of the encoder 31 upon appearance of the P-edge) by the count value $d_{p0}$ and controls the angular position of the motor 13 using the count value of the encoder 31 based on the reference angular position.

Alternatively, in the absence of the count value $d_{p0}$ in the backup RAM 35, the CPU 33 performs the P-side wall hitting control operation, determines the count value PwStep of the encoder 31 as a temporal reference angular position of the motor 13, and controls the angular position of the motor 13 using the count value of the encoder 31. Subsequently, when the P-edge appears at the output of the output shaft sensor 16, the CPU 33 samples an instant count value of the encoder 31 as the count value the count value $d_{p0}$ and stores it in the backup RAM 35 as data on the mounting angle of the output shaft sensor 16.

Figure 6:
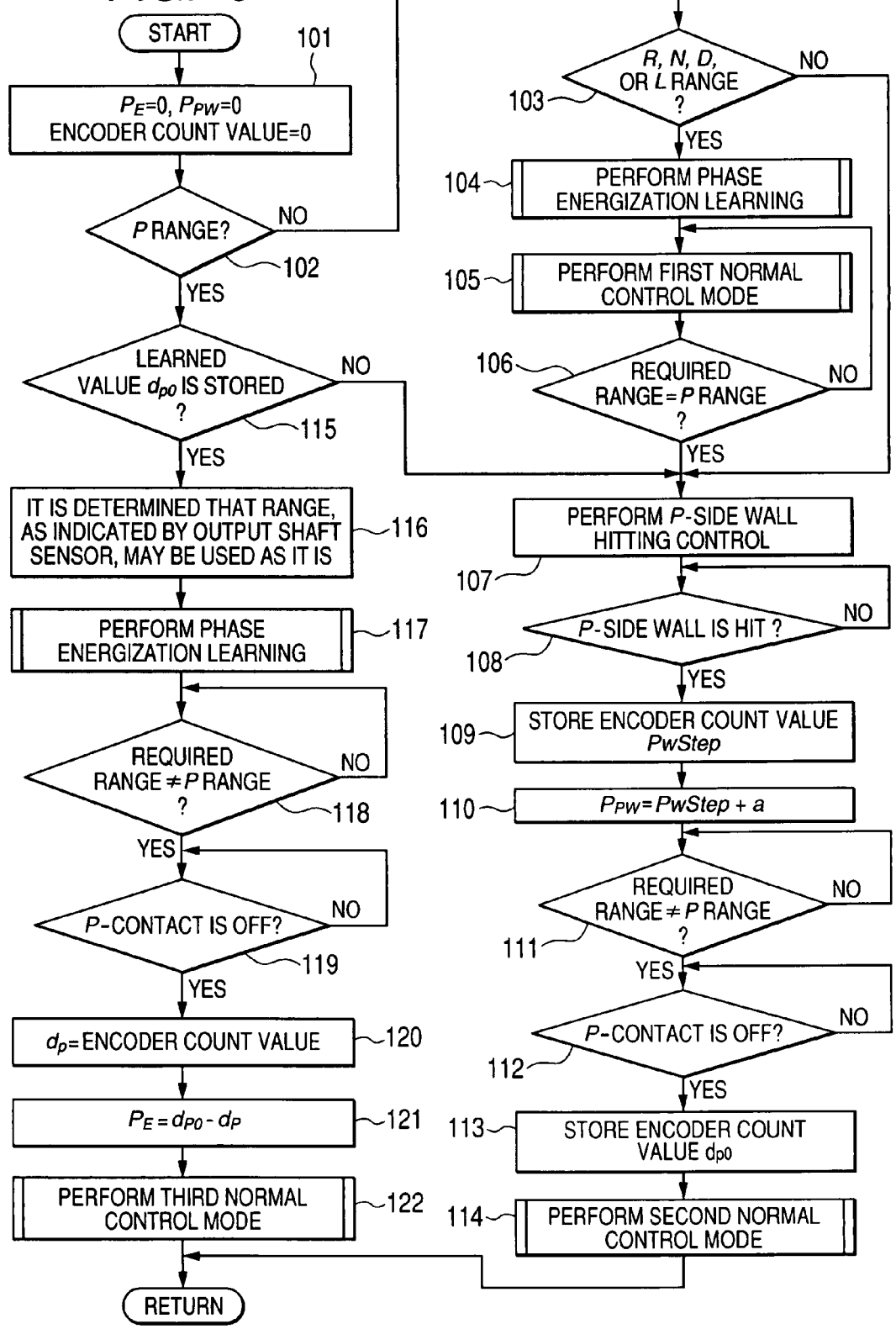
FIG. 6 is a flowchart of a system start program to be executed by the range shift controller, as illustrated in FIG. 2.

FIG. 6 is a flowchart of logical steps or a system start program to be executed by the CPU 33 of the range shift controller 32 to control the angular position of the motor 13. This program is performed only one time upon turning on of the range shift controller 32.

After entering the program, the routine proceeds to step 101 wherein correction values $P_E$ and $P_{EW}$ (see FIG. 5) stored in the RAM 35 which are to be employed in second and third control modes, as will be described later in detail, are initialized to zero (0), and the count value of the encoder 31 is also initialized to zero (0).

The routine proceeds to step 102 wherein it is determined whether the output of the output shaft sensor 16, as sampled upon start of this program, represents the P range of the automatic transmission 12 (i.e., the angular range P of the output shaft 15) or not. If a NO answer is obtained, then the routine proceeds to step 103 wherein it is determined whether the output of the output shaft sensor 16 represents any one of the R, N, D, and L range or not.

If a YES answer is obtained in step 103, then the routine proceeds to step 104 wherein phase energization learning is performed to specify a relation between the count value of the encoder 31 and an energized one(s) of the phase windings of the motor 13 (i.e., the angular position of the rotor of the motor 13).

The phase energization learning is taught in, for example, US2006/0197489 A1, filed on Sep. 7, 2006 (Japanese Patent First Publication No. 2004-15849), the disclosure of which is incorporated herein by reference. The phase energization learning is achieved after turning on of the gear shift controller 32 by entering an initial motor-driving stage, switching the phase windings of the motor 13 between an energized mode and a deenergized state to complete in a given time scheduled sequence once to rotate the motor 13 to find a matching between any one of the phase windings and the angular position of the motor 13, and then counting, as described above, the edges of the A- and B-phase signals, as outputted from the encoder 31 at a given interval following rotation of the rotor, to specify or lean the relation between the count value of the encoder 31 and one(s) of the phase windings of the motor 13 which is energized at the end of the initial motor-driving mode.

For instance, in the case where the motor 13 is equipped with three-phase windings: a U-phase winding, a V-phase winding, and a W-phase winding, and the range shift controller 32 is turned on in the D range, the phase energization learning is accomplished by energizing the motor 13 selectively in a sequence of the V-phase winding, the UV-phase windings, the U-phase winding, the UW-phase windings, the W-phase winding, and the VW-phase windings to reverse the rotor of the motor 13 (i.e., the D range to the P range of the automatic transmission 12), thereby causing a correspondence between any one of the phase windings and the angular position of the rotor of the motor 13 to always appear in the course of a complete rotation of the motor 13. After the appearance of such a correspondence, the rotor will rotate in synchronism with switching of the phase windings of the motor 13 between the energized state and the deenergized state, so that the edges of the A- and B-phase signals will be outputted from the encoder 31 in synchronism with the rotation of the rotor. This enables the amount by which the rotor of the motor 13 has rotated actually in synchronism with the switching of the phase windings until completion of the initial motor-driving mode (i.e., an actual rotated angle of the rotor) to be found by knowing the count value of the encoder 31 at the end of the initial motor-driving mode, thereby specifying the correspondence between the count value of the encoder 31 and each of the phase windings of the motor 13 (i.e., the angular position of the rotor).

After the completion of the phase energization learning, the routine proceeds to step 105 wherein a first normal control mode is entered. In the first normal control mode, the CPU 33 looks up a target controlled motor position table, as illustrated in FIG. 7, to determine the value of a target controlled motor position which corresponds to a selected or target one of the P, R, N, D, and L ranges. In the table, when the target range is the P range, the target controlled motor position is set to zero (0). When the target range is the R range, the target controlled motor position is set to $D_{P-R}$. When the target range is the N range, the target controlled motor position is set to $D_{P-N}$. When the target range is the D range, the target controlled motor position is set to $D_{P-D}$. When the target range is the L range, the target controlled motor position is set to $D_{P-L}$. The target controlled motor position at the P-side wall is set to a minus limit value, for example, −1000. The target controlled motor position at the D-side wall is set to a plus limit value, for example, +2000. The P-side wall is, as described above, one of the side walls of the P-range recess 25 that is one of limits of the movable range in the range shift mechanism 11 on the side of the P range of the automatic transmission 12. The D-side wall is one of the side walls of the D-range recess 25 that is one of limits of the movable range in the range shift mechanism 11 on the side of the D range of the automatic transmission 12. The target controlled motor position in each of the P to L ranges is defined, as can be seen in FIG. 5, at the center of a corresponding one of the angular ranges (i.e., the gear range establishment zones) P, R, N, D, and L of the output shaft 15.

In the first normal control mode, when the target range of the automatic transmission 12 is changed from R to D range, the CPU 33 rotates the motor 13 toward the D range until the count value of the encoder 31 reaches the target controlled motor position $D_{P-D}$ and then stops rotating the motor 13. Note that the count value of the encoder 31 is initialized to zero (0) upon turning on of the range shift controller 32.

After the first normal control mode is initiated, the routine proceeds to step 106 wherein it is determined whether a selected or required range is the P range or not. If a NO answer is obtained, then the routine repeats step 105. Alternatively, if a YES answer is obtained, then the routine proceeds to step 107 wherein the P-side wall hitting control operation, as described above is performed. The routine proceeds to step 108 wherein it is determined whether the pin 27 of the detent spring 26 has hit the P-side wall of the detent lever 18 or not. If a NO answer is obtained, then the routine repeats step 108. Specifically, the CPU 33 reverses the motor 13 until the pin 27 of the detent spring 26 hits the P-side wall of the detent lever 18.

At the time when the pin 27 hits the P-side wall of the detent lever 18, the CPU 33 stops rotating the motor 13. The routine proceeds to step 109 wherein the output of the encoder 31 is sampled and stored as the count value PwStep. The routine proceeds to step 110 wherein a backlash/play caused error correction value a is added to the count value PwStep to derive a corrected encoder count value $P_{PW}$ for compensating an error in the count value of the encoder 31 when the pin 27 hits the P-side wall of the detent lever 18 arising from the mechanical backlash and play of the torque transmission mechanism, as described above. The backlash/play caused error correction value a is given by the following equation.

$$a = (\text{motor movable range} - \text{detent lever movable range}) \div 2$$

The motor movable range is a range in which the motor 13 is permitted to rotate and which is determined by a difference between the count value of the encoder 31 when the pin 27 hits the D-side wall and that when the pin 27 hits the P-side wall. In the absence of both such events, a design value (or a middle value of a variation in the above difference of mass-produced torque transmission mechanisms) is used as the backlash/play caused error correction value a. The same applies to the detent lever movable range that is a range in which the detent lever 18 is permitted to rotate.

After step 110, the routine proceeds to step 111 wherein it is determined whether the required range is one of the R, N, D, and L range other than the P range or not. If a NO answer is obtained, the routine waits at step 111 until the required range is changed from the P range. Alternatively, if a YES answer is obtained in step 111, and the motor 13 has started to rotate in the normal direction (i.e., a direction from the P range to the R range), then the routine proceeds to step 112 wherein it is determined whether the P-contact of the output shaft sensor 16 has been changed from the on-state to the off-state or not. If a NO answer is obtained, then the routine repeats step 112. Specifically, the routine waits at step 112 until the P-edge appears at the signal produced by the P-contact of the output shaft sensor 16.

When the P-contact of the output shaft sensor 16 has been changed from the on-state to the off-state and produces the P-edge, the routine proceeds to step 113 wherein the count value of the encoder 31, as outputted upon appearance of the P-edge, is stored in the backup RAM 35 as the count value $d_{p0}$ which represents, as described above, the mounting angle of the output shaft sensor 16.

The routine proceeds to step 114 wherein a second normal control mode is entered. Specifically, the CPU 33 looks up a target controlled motor position table, as illustrated in FIG. 8, to determine the value of a target controlled motor position (i.e., a target count value of the encoder 31) which corresponds to a selected or target one of the P, R, N, D, and L ranges. The values of the target controlled motor positions in the P, R, N, D, and L ranges, as listed in the table of FIG. 8, are values which are derived, respectively, by correcting the ones, as listed in table of FIG. 7, by the corrected encoder count value $P_{PW}$, as derived in step 110.

More specifically, in the second normal control mode, the target controlled motor position of the P range is set to the corrected encoder count value $P_{PW}$. The target controlled motor position of the R range is set to $D_{P\text{-}R} + P_{PW}$. The target controlled motor position of the N range is set to $D_{P\text{-}N} + P_{PW}$. The target controlled motor position of the D range is set to $D_{P\text{-}D} + P_{PW}$. The target controlled motor position of the L range is set to $D_{P\text{-}L} + P_{PW}$. Like in table in FIG. 7, the target controlled motor position at the P-side wall is set to a minus limit value, for example, −1000. The target controlled motor position at the D-side wall is set to a plus limit value, for example, +2000.

In the second normal control mode, when the target range of the automatic transmission 12 is changed to, for example, the D range, the CPU 33 rotates the motor 13 toward the D range until the count value of the encoder 31 reaches the target controlled motor position $D_{P\text{-}D} + P_{PW}$ and then stops rotating the motor 13.

If a YES answer is obtained in step 102 meaning that the output of the output shaft sensor 16, as sampled upon start of this program, represents the P range of the automatic transmission 12, then the routine proceeds to step 115 wherein it is determined whether the count value $d_{p0}$, as learned in step 113, is stored in the backup RAM 35 or not. If a NO answer is obtained meaning that the count value $d_{p0}$ is not in the backup RAM 35, then the routine proceeds directly to steps 107 to 113, as described above.

Specifically, when the backup RAM 35 does not retain the count value $d_{p0}$, the CPU 33 performs the P-side wall hitting control operation and correct the count value PwStep using the backlash/play caused error correction value a to derive the encoder count value $P_{PW}$ for compensating an error in the count value of the encoder 31 when the pin 27 hits the P-side wall of the detent lever 18 which arises from the mechanical backlash and play of the torque transmission mechanism, as described above. The CPU 33 then learns the count value $d_{p0}$ upon appearance of the P-edge at the output from the output shaft sensor 16, stores it in the backup RAM 35, looks up the table of FIG. 8, and enters the second normal control mode.

Alternatively, if a YES answer is obtained in step 115 meaning that the backup RAM 35 retains the count value $d_{p0}$, then the routine proceeds to step 116 without performing the P-side wall hitting control operation. In step 116, it is determined that one of the P, R, N, D, and L ranges of the automatic transmission 12, as represented by the output of the output shaft sensor 16, may be used as indicating a selected one of the he P, R, N, D, and L ranges accurately.

The routine proceeds to step 117 wherein the same phase energization learning as in step 104 is performed to learn the correspondence between the count value of the encoder 31 and one of the phase windings of the motor 13 (i.e., the angular position of the rotor of the motor 13).

The routine proceeds to step 118 wherein it is determined whether the required range is one of the R, N, D, and L range other than the P range or not. If a NO answer is obtained, the routine waits at step 118 until the required range is changed from the P range. Alternatively, if a YES answer is obtained in step 118, and the motor 13 has started to rotate in the normal direction (i.e., a direction from the P range to the R range), then the routine proceeds to step 119 wherein it is determined whether the P-contact of the output shaft sensor 16 has been changed from the on-state to the off-state or not. If a NO answer is obtained, then the routine repeats step 119. Specifically, the routine waits at step 119 until the P-edge appears at the signal produced by the P-contact of the output shaft sensor 16.

When the P-contact of the output shaft sensor 16 has been changed from the on-state to the off-state and produces the P-edge, the routine proceeds to step 120 wherein the count value of the encoder 31, as outputted upon appearance of the P-edge, is stored in the backup RAM 35 as the count value $d_p$.

The routine proceeds to step 121 wherein the count value $d_{p0}$ is corrected by the count value $d_p$ to derive a corrected encoder count value $P_E$.

The routine proceeds to step 122 wherein a third normal control mode is entered. Specifically, the CPU 33 looks up a target controlled motor position table, as illustrated in FIG. 9, to determine the value of a target controlled motor position (i.e., a target count value of the encoder 31) which corresponds to a selected or target one of the P, R, N, D, and L ranges. The values of the target controlled motor positions in the P, R, N, D, and L ranges, as listed in the table of FIG. 9, are values which are derived, respectively, by correcting the ones, as listed in table of FIG. 7, by the corrected encoder count value $P_E$, as derived in step 121.

More specifically, in the third normal control mode, the target controlled motor position of the P range is set to the corrected encoder count value $P_E$. The target controlled motor position of the R range is set to $D_{P\text{-}R} + P_E$. The target controlled motor position of the N range is set to $D_{P\text{-}N} + P_E$. The target controlled motor position of the D range is set to $D_{P\text{-}D} + P_E$. The target controlled motor position of the L range is set to $D_{P\text{-}L} + P_E$. Like in table of FIG. 7, the target controlled motor position at the P-side wall is set to a minus limit value, for example, −1000. The target controlled motor position at the D-side wall is set to a plus limit value, for example, +2000.

In the third normal control mode, when the target range of the automatic transmission 12 is changed to, for example, the D range, the CPU 33 rotates the motor 13 toward the D range until the count value of the encoder 31 reaches the target controlled motor position $D_{P\text{-}D} + P_E$ and then stops rotating the motor 13.

As apparent from the above discussion, when the direction of torque, as created by the elastic pressure of the detent spring 26, is opposite that of torque outputted by the motor 13, for example, when the motor 13 rotates to move the detent lever 18 from the P-range position to the R-range position, so that the P-contact of the output shaft sensor 16 is changed from the on-state to the off-state to produce the P-edge, the CPU 33 of the range shift controller 32 determines the angular position of the motor 13 upon appearance of the P-edge as the reference angular position. Subsequently, when it is required to move the detent lever 18 to a selected angular position, the CPU 33 determines an amount by which the motor 13 is to be rotated based on the reference angular position, as determined above, and then rotates the motor 13 while monitoring the angular position of the motor 13 using on the output of the encoder 31. This ensures the accuracy in moving the range shift mechanism 11 free from the backlash and play of the torque transmission mechanism without the need for performing the P-side wall hitting control operation every request to rotate the motor 13 which will result in a great mechanical load on the detent mechanism 28 or parts of the torque transmission mechanism, thus resulting in improved reliability and durability of the system.

In the absence of the count value $d_{p0}$ of the encoder 31 which represents the mounting angle of the output shaft sensor 16, the CPU 33 performs the P-side wall hitting control operation to sample the count value PwStep of the encoder 31 at the time when the pin 27 of the detent spring 26 hits the side wall of the P-range recess 25, then also sample the count value $d_{po}$ upon appearance of the P-edge at the output of the output shaft sensor 16, stores it in the backup RAM 35 as representing the mounting angle of the output shaft sensor 16, thereby enabling the CPU 33 to control the operation of the range shift mechanism 11 through the motor 13 free from the mounting angle of the output shaft sensor 16.

The CPU 33, as described above, samples the P-edge of the output of the output shaft sensor 16, i.e., the instant when the P-contact of the output shaft sensor 16 is changed from the on-state to the off-state, as representing the angular position of the detent lever 18 where the direction of torque, as created by the elastic pressure of the detent spring 26, is opposite that of torque outputted by the motor 13, but however, the CPU 33 may sample the instant where one of the R-, N-, D-, and L-contacts other than the P-contact, for example, the N-contact is changed from the on-state to the off-state.

The on-durations of the P-, R-, N-, D-, and L-contacts of the output shaft sensor 16 are selected not to overlap each other, but however, partially overlap each other. Specifically, the P-, R-, N-, D-, and L-contacts may be so designed as to know the event that the direction of torque, as created by the elastic pressure of the detent spring 26, is opposite that of torque outputted by the motor 13 using a combination of on-off states of the P-, R-, N-, D-, and L-contacts.

The second embodiment will be described below.

Figure 10:
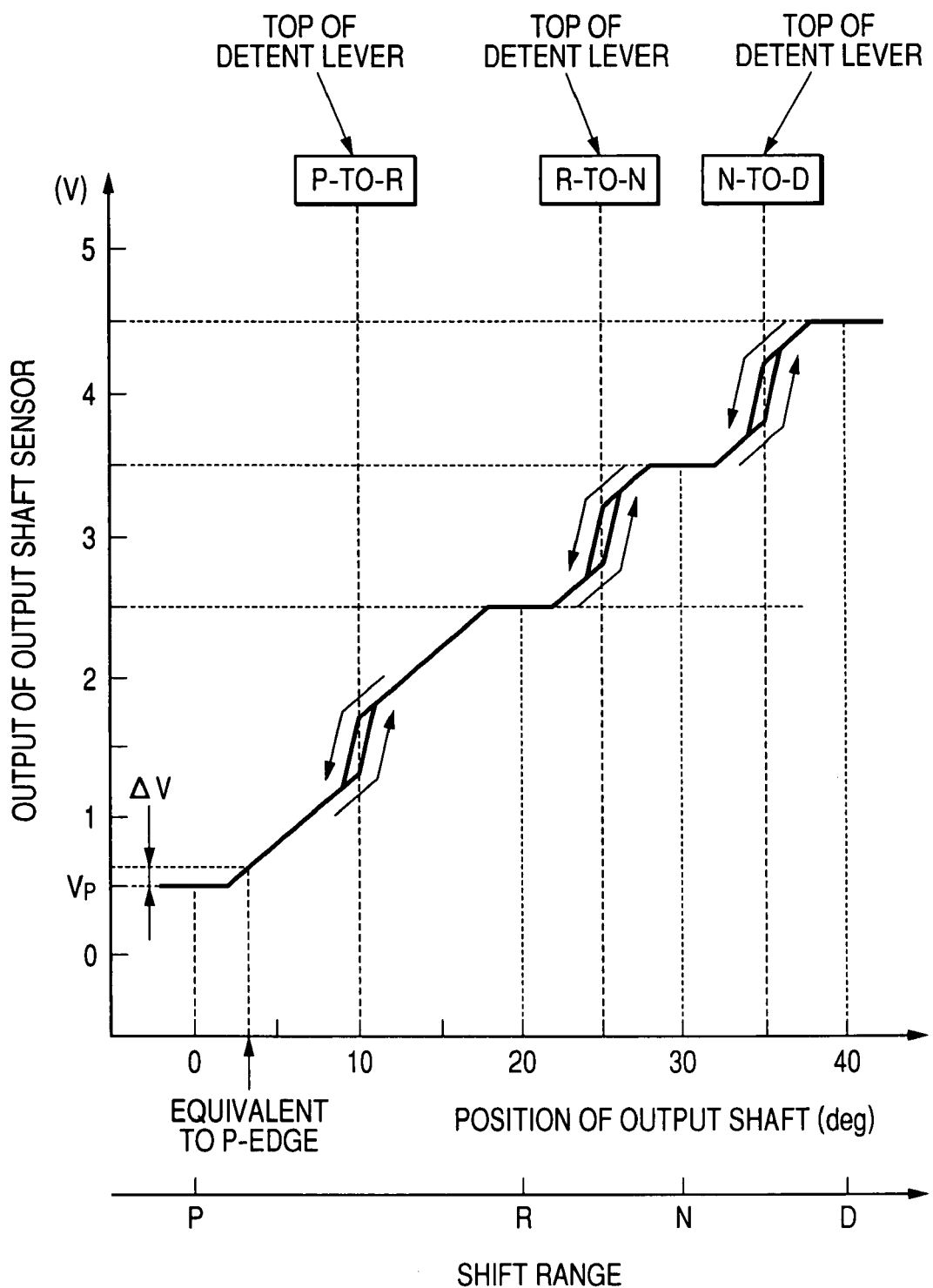
FIG. 10 is a view which shows output voltage characteristics of an output shaft sensor used in the second embodiment of the invention.

The output shaft sensor 16 is implemented by, for example, a potensiometer which, as illustrated in FIG. 10, produces an output changing continuously with rotation of the output shaft 15 which represents the angular position of the output shaft 15 continuously.

The CPU 33 may sample the angular position of the detent lever 18 when the P, R, N, D and L ranges have been changed from one to another, and the output of the output shaft sensor 16 has changed by an amount greater than a given limit value to know the event that the direction of torque, as created by the elastic pressure of the detent spring 26, is opposite that of torque outputted by the motor 13. Specifically, for example, when the P range is changed to another, and the output $V_p$ of the output shaft sensor 16 has changed by a given level $\Delta V$ (which corresponds to the angular position of the output shaft 15 upon appearance of the P-edge), the CPU 33 may determine that the direction of torque, as created by the elastic pressure of the detent spring 26, is now opposite that of torque outputted by the motor 13.

The encoder 31 is of a magnetic type, but may be of an optical or a brush type.

The motor 13 may not be the SR motor and can be of any type of synchronous motor in which the angular position of a rotor may be monitored by the CPU 33 using the count value of the encoder 31 to switch phase windings between on- and off-states.

The invention may be used with a variety of devices other than the range shift controller 32 which are equipped with a power source made of a synchronous motor such as the SR motor.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A position shift control apparatus comprising:

a motor joined to an object through an output shaft and a torque transmission mechanism to move the object to a target position;

a detent mechanism working to produce elastic pressure to hold the object at the target position;

an output shaft position sensor which measures an angular position of the output shaft to produce an output indicative thereof;

a motor position sensor which measures an angular position of the motor to produce an output indicative thereof; and a controller which controls an operation of said motor to move the object, said controller determining a value of the angular position of said motor, as sampled upon a change in the output from the output shaft position sensor, as a reference angular position of said motor when torque, which is created by the elastic pressure produced by said detent mechanism and acts on the output shaft during rotation of said motor, is opposite in orientation to that outputted by said motor, said controller monitoring the output of the motor position sensor and shifting the angular position of said motor into agreement with a position which corresponds to the target position of the object and is determined based on the reference angular position to move the object to the target position thereof.

2. A position shift control apparatus as set forth in claim 1, wherein said output shaft position sensor is mounted on said motor, and wherein said controller is designed to perform a reference angular position correction mode which rotates said motor until a limit of a rotatable range of said motor, as defined by said detent mechanism, is reached and then determines an angle between a value of the angular position of said motor at the limit, as indicated by the output of said motor position sensor, and the reference angular position as a learned value of a mounting angle at which said output shaft position sensor is mounted on said motor to correct the reference angular position using the learned value.

3. A position shift control apparatus as set forth in claim 2, further comprising a storage which works to retain the learned value of the mounting angle of said output shaft position sensor even when said controller is powered off, and wherein when the learned value is retained in the storage, said controller monitoring the output of the motor position sensor and shifting the angular position of said motor into agreement with the position which corresponds to the target position of the object and is determined based on the reference angular position, as corrected by the learned value, to move the object to the target position thereof, in the absence of the learned value in the storage, said controller rotating said motor until the limit of the rotatable range of said motor is reached and then determining a value of the angular position of said motor at the limit as a temporal reference angular position of said motor for use in controlling the angular position of said motor based on the output of said motor position sensor, subsequently, when the angular position of the motor reaches a position, as indicated by the output of said motor position as the reference angular position, said controller finding and determining the angle between the value of the angular position of said motor at the limit and the position, as indicated as the reference angular position, as the learned value of the mounting angle, and retaining the learned value in the storage.

4. A position shift control apparatus as set forth in claim 3, wherein said storage is a nonvolatile memory which continues to retain the learned value even in the absence of supply of power to said controller.

5. A position shift control apparatus as set forth in claim 3, wherein said storage is a rewriteable nonvolatile memory.

6. A position shift control apparatus as set forth in claim 1, wherein said output shaft position sensor is equipped with a plurality of electrical contacts each of which is turned on when the output shaft lies in one of discrete positions, and wherein said controller determines which of the electrical contacts is in an on-state to know one of the discrete positions at which the output shaft is lying.

7. A position shift control apparatus as set forth in claim 1, wherein said output shaft position sensor is designed to produce the output which changes in electrical level continuously with rotation of the output shaft for measuring the angular position of the output shaft continuously.

8. A position shift control apparatus as set forth in claim 1, wherein the object is a range shift mechanism working to shift a gear range of an automotive automatic transmission.

* * * * *